United States Patent
Bonn et al.

(10) Patent No.: US 9,282,442 B1
(45) Date of Patent: Mar. 8, 2016

(54) COMMUNICATION SYSTEM TO ROUTE TELEPHONY SIGNALS BASED ON ORIGINATING LINE INFORMATION

(71) Applicant: Sprint Communications Company L.P., Overland Park, KS (US)

(72) Inventors: Mark J. Bonn, Granite Bay, CA (US); Cory A. Yang, Fremont, CA (US); Kuncheng Richard Yang, Fremont, CA (US); Quang Ba Doan, Roseville, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/526,883

(22) Filed: Oct. 29, 2014

(51) Int. Cl.
  *H04W 4/12* (2009.01)
  *H04M 15/00* (2006.01)

(52) U.S. Cl.
  CPC ............... *H04W 4/12* (2013.01); *H04M 15/00* (2013.01); *H04M 15/43* (2013.01); *H04M 15/8044* (2013.01); *H04M 2215/42* (2013.01); *H04M 2215/745* (2013.01)

(58) Field of Classification Search
  CPC ............... H04L 29/06; H04L 12/6418; H04L 2012/6443; H04L 2012/6481; H04L 2012/6486; H04L 12/2801; H04L 12/289; H04L 12/58; H04L 2012/6424; H04M 11/062; H04M 7/0009; H04M 7/1295; H04M 1/654; H04M 7/0015; H04M 15/8022; H04M 15/8038; H04M 1/64; H04M 2203/2016; H04M 2203/2027; H04M 3/42229; H04Q 2213/13389; H04Q 1/028; H04Q 2213/13196; H04Q 2213/13098; H04W 36/14; H04W 36/36; H04W 48/20; H04W 76/02; H04W 88/06; H04W 88/16; H04N 1/32704; H04N 1/32708; H04N 1/32717; H04N 1/32732; H04N 7/17354
See application file for complete search history.

(56) References Cited

U.S. PATENT DOCUMENTS

| | | | |
|---|---|---|---|
| 6,222,912 B1 | 4/2001 | Breuer | |
| 6,671,359 B1 * | 12/2003 | Enzmann et al. | 379/115.01 |
| 7,242,759 B1 * | 7/2007 | Sanchez et al. | 379/219 |
| 7,336,649 B1 * | 2/2008 | Huang | 370/352 |
| 7,929,676 B2 | 4/2011 | Davis et al. | |

(Continued)

FOREIGN PATENT DOCUMENTS

CN 101175096 B 5/2008

OTHER PUBLICATIONS

U.S. Appl. No. 13/442,412, filed Apr. 9, 2012.

*Primary Examiner* — Nizar Sivji

(57) ABSTRACT

A communication system to route telephony signals based on OLI. The communication system includes a telephony signaling system and a call processing system. The telephony signaling system receives a first signaling message over an originating line indicating a telephony number and in response, generates and transfers a second signaling message indicating the telephony number and the OLI for delivery to a call processing system. The call processing system receives the second signaling message, and in response, processes the telephony number to identify a RespOrg. The call processing system processes the OLI based on the identified RespOrg to select a CIC. Call processing system generates and transfers a third signaling message indicating the selected CIC for delivery to the telephony signaling system. The telephony signaling system receives the third signaling message, and in response, generates and transfers a fourth signaling message for delivery to a telephony network based on the selected CIC.

16 Claims, 6 Drawing Sheets

(56) References Cited

U.S. PATENT DOCUMENTS

| | | |
|---|---|---|
| 8,036,214 B2 | 10/2011 | Elliott et al. |
| 8,254,912 B2 * | 8/2012 | Silver .................. 455/426.1 |
| 8,306,200 B2 | 11/2012 | Bajpay et al. |
| 8,451,716 B2 | 5/2013 | MeLampy et al. |
| 8,537,663 B2 | 9/2013 | Poulson et al. |
| 2002/0027982 A1 * | 3/2002 | Plunkett et al. .......... 379/221.02 |
| 2004/0063432 A1 * | 4/2004 | Borsan ......................... 455/445 |
| 2005/0180390 A1 | 8/2005 | Baruzzi et al. |
| 2006/0019667 A1 * | 1/2006 | Hicks, III ..................... 455/445 |
| 2007/0047732 A1 * | 3/2007 | Kennedy .................. 379/413.02 |
| 2011/0040884 A1 * | 2/2011 | Khadri et al. ................. 709/228 |

* cited by examiner

COMMUNICATION SYSTEM TO ROUTE TELEPHONY SIGNALS BASED ON ORIGINATING LINE INFORMATION

TECHNICAL BACKGROUND

Communication networks comprise a collection of nodes connected together with communication links. A communication network may also be connected to other communication networks. The nodes transfer communication signaling to allow users to communicate. The communication networks use circuit switching, message switching, or packet switching to pass signals through the communication links and nodes between endpoints. Although not required, in some cases, the signals may traverse multiple communication networks between endpoints. For example, a wireless communication device user may be routed through a wireless communication network to a Public Switched Telephone (PSTN) to a landline user.

Communication enterprises own special service telephony numbers, such as "800" and "900" type numbers. The communication enterprises lease these special service numbers to various telephony customers, such as retail businesses and government entities who usually receive large volumes of calls. When a call to a special service number is placed, the special service number is typically used to route the call to the communication enterprise that owns the special service number—or its designated host network. The communication enterprise or its host then accesses a special service routing database system to translate the special service number into a routable telephony number using various criteria, such as caller number, time-of-day, customer routing plans, and the like. Thus, the special service numbers trigger dynamically intelligent call routing for the special service telephony customers.

Special service calls may traverse multiple communication networks to reach the communication enterprises that own the special service numbers. The special service calls often utilize signaling systems such as Signaling System 7 (SS7), Session Initiation Protocol (SIP), Long Term Evolution (LTE), and the like. These protocols may use Carrier Identification Codes (CICs) or the like to individually identify the various communication networks. On some special service calls, the communication network is also the enterprise who owns the special service number, and the CIC for that network is used to route the special service calls to the communication network.

The entity that controls the special service routing database system for a given special service telephony number is referred to as the Responsible Organization (RespOrg) for that special service number. The RespOrg is typically one of the communication enterprises described above that also owns and leases special service numbers. In many cases, the communication enterprise that owns the special service number also operates a communication network identified by a CIC, and in these cases, CIC-based routing may be used on special service calls.

In other cases, the communication enterprise that owns the special service number may be the RespOrg, but may not operate a communication network identified by a CIC. In these other cases, the RespOrg enterprise typically contracts with a network operator who does have a CIC. The following technology provides a attractive RespOrg-based routing alternative for these other cases.

OVERVIEW

Examples disclosed herein provide a system, method, hardware, and software to route telephony signals based on Originating Line Information (OLI). In one instance, the method includes a telephony signaling system receiving a first signaling message over an originating line indicating a telephony number. The method further includes, the telephony signaling system generating a second signaling message indicating the telephony number and the OLI for the telephony call. The method further provides the telephony signaling system transferring the second signaling message for delivery to a call processing system. The method includes the call processing system receiving the second signaling message, and in response, processing the telephony number to identify a Responsible Organization (RespOrg) for the telephony call. The method further includes, the call processing system processing the OLI from the second signaling message based on the identified RespOrg to select a Carrier Identity Code (CIC) and generating a third signaling message indicating the selected CIC for the telephony call. The method further provides the call processing system transferring the third signaling message for delivery to the telephony signaling system. The method further includes the telephony signaling system receiving the third signaling message, and in response, generating a fourth signaling message and transferring the fourth signaling message for delivery to a telephony network based on the selected CIC.

In another example, a communication system to route telephony signals based on OLI. The communication system includes a telephony signaling system and a call processing system. The telephony signaling system receives a first signaling message over an originating line indicating a telephony number and generates a second signaling message indicating the telephony number and the OLI for the telephony call. The telephony signaling system transfers the second signaling message for delivery to a call processing system. The call processing system receives the second signaling message, and in response, processes the telephony number to identify RespOrg for the telephony call. The call processing system processes the OLI from the second signaling message based on the identified RespOrg to select a CIC and generates a third signaling message indicating the selected CIC for the telephony call. The call processing system transfers the third signaling message for delivery to the telephony signaling system. The telephony signaling system receives the third signaling message, and in response, generates a fourth signaling message and transfers the fourth signaling message for delivery to a telephony network based on the selected CIC.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
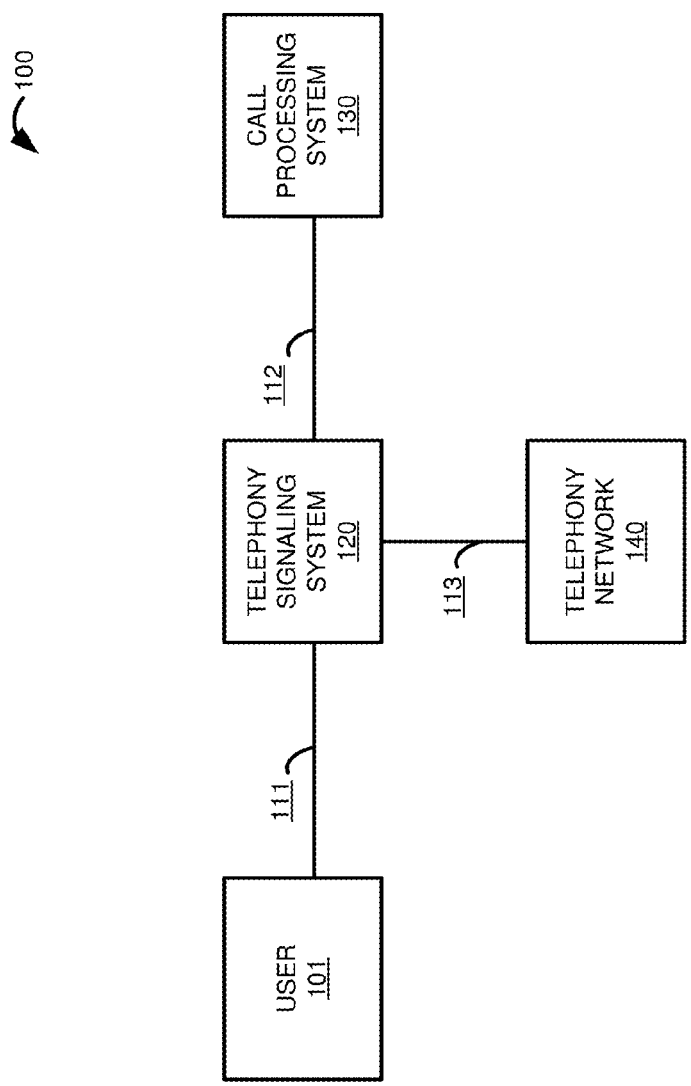
FIG. 1 illustrates a communication system to route telephony signals based on Originating Line Information (OLI).

FIG. 1 illustrates communication system 100 to route telephony signals based on Originating Line Information (OLI). Communication system 100 includes user 101, telephony signaling system 120, call processing system 130, telephony network 140, and communication links 111-113. User 101 communicates with telephony signaling system 120 over communication link 111. Telephony signaling system 120 communicates with call processing system 130 over communication link 112. Telephony signaling system 120 and telephony network 140 communicate over communication link 113. Although, call processing system 130 is shown external to telephony signaling system 120 and telephony network 140, call processing system 130 could be integrated within the components of telephony signaling system 120 and telephony network 140. Communication system 100 may include other components not shown for clarity.

In operation, telephony signaling system 120 receives a first signaling message over an originating line indicating a telephony number. For example, the telephony number may be a special service telephony number, such as an "800," "900," or some other special number for some other special service. The first signaling message could utilize signaling systems such as Signaling System 7 (SS7), Session Initiation Protocol (SIP), Long Term Evolution (LTE), and the like.

Telephony signaling system 120 generates a second signaling message indicating the telephony number and the OLI for the telephony call. For example, the second signaling message may indicate the first signaling message is received over a Wireless Fidelity (WIFI) network. In other examples, the first signaling message may be received over a Long Term Evolution (LTE) network. In yet other examples, the first signaling message may be received over a Code Division Multiple Access (CDMA) network. The second signaling message could utilize signaling systems such as SS7, SIP, LTE, and the like. The second signaling message may include other information such as the organization identity for the responsible organization, the special call number, and so forth. Telephony signaling system 120 transfers the second signaling message for delivery to call processing system 130.

Call processing system 130 receives and processes the second signaling message. Call processing system 130 processes the telephony number to identify an organization identity for a responsible organization. The responsible organization is responsible for a routing database system for the telephony number. The organization identity could be a RespOrg corresponding to the responsible organization or some other technique for conveying the identity of the responsible organization. The routing database system could be a service control point (SCP), application server, computer system, and the like.

Call processing system 130 processes the OLI from the second signaling message based on the identified RespOrg to select a Carrier Identity Code (CIC) and generates a third signaling message indicating the selected CIC for the telephony call. Call processing system 130 transfers the third signaling message for delivery to telephony signaling system 120. Telephony signaling system 120 receives the third signaling message, and in response, generates and transfers a fourth signaling message for delivery to telephony network 140 based on the selected CIC.

Examples of telephony signaling system 120 include soft switches, telephony servers, call state control functions, wireless access nodes, border controllers, packet gateways, and/or some other communication network element—including combinations thereof. Examples of call processing system 130 include Service Control Points (SCPs), application servers, network control databases, and and/or some other communication network element—including combinations thereof.

Examples of telephony network 140 includes communication networks such as, Long Term Evolution (LTE) networks, Evolution Data Optimized (EVDO) networks, Code Division Multiple Access (CDMA) networks, Global System for Mobile communications (GSM) networks, High Speed Packet Access (HSPA) networks, Wireless Fidelity (WIFI) networks, Worldwide Interoperability for Microwave Access (WIMAX) networks, satellite networks, Public Switched Networks (PSTN), Internet Protocol (IP) networks, the Internet, and the like—including combinations thereof.

Figure 2:
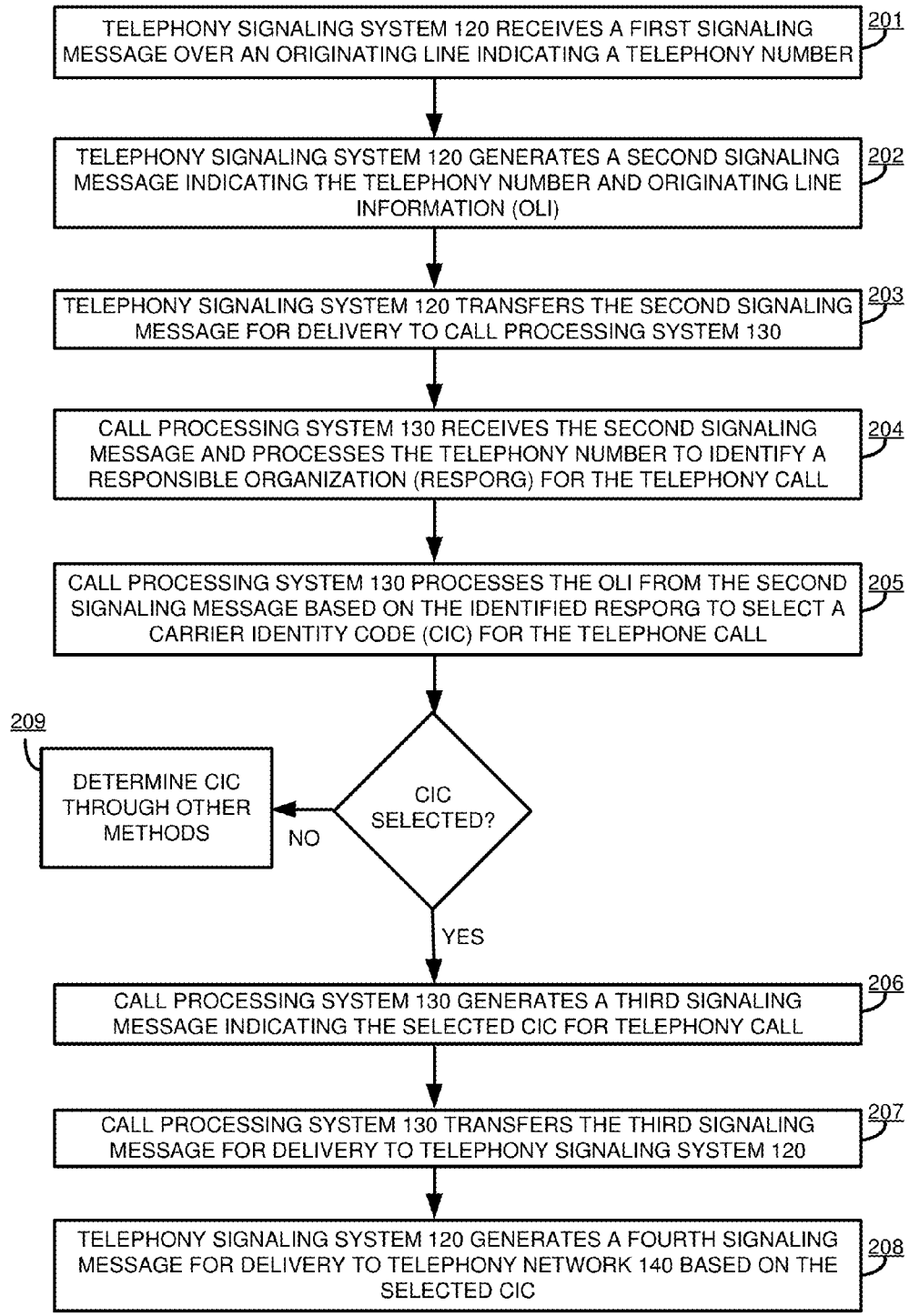
FIG. 2 illustrates the operation of the communication system to route telephony signals based on OLI.

FIG. 2 illustrates the operation of communication system 100 to route telephony signals based on OLI. Telephony signaling system 120 receives a first signaling message over an originating line indicating a telephony number (201). Telephony signaling system 120 generates a second signaling message indicating the telephony number and the OLI (202). Telephony signaling system 120 transfers the second signaling message for delivery to call processing system 130 (203).

Call processing system 130 receives the second signaling message, and in response, processes the telephony number to identify a RespOrg for the telephony call (204). Call processing system 130 processes the OLI from the second signaling message based on the identified RespOrg to select a CIC (205). Call processing system 130 generates a third signaling message indicating the selected CIC for the telephony call (206). Call processing system 130 transfers the third signaling message for delivery to telephony signaling system 120 (207). Telephony signaling system 120 receives the third signaling message, and in response, generates and transfers a fourth signaling message for delivery to telephony network 140 based on the selected CIC (208).

Figure 3:
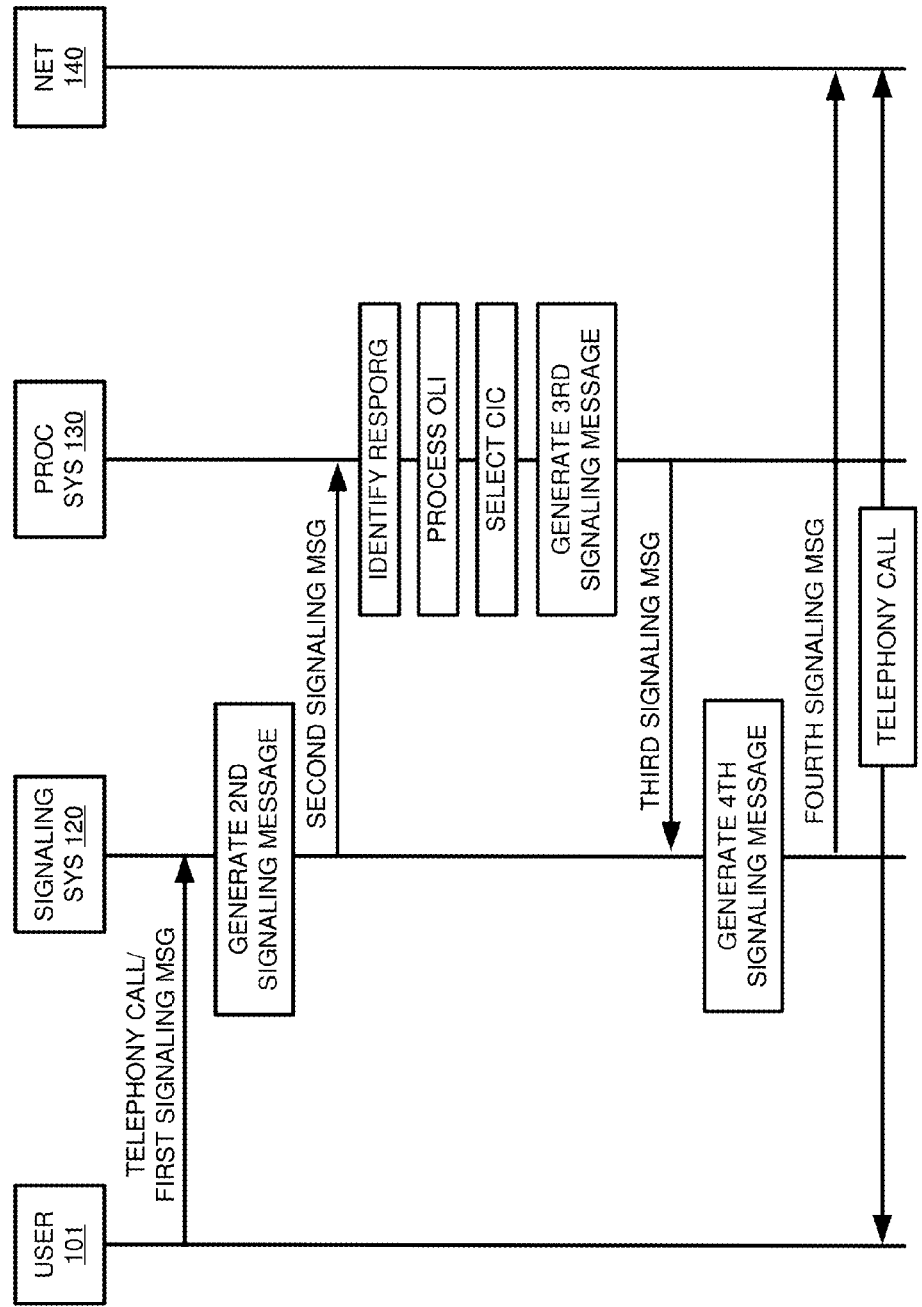
FIG. 3 illustrates the operation of the communication system to route telephony signals based on OLI.

FIG. 3 illustrates the operation of communication system 100 to route telephony signals based on OLI. For example, user 101 makes a special service telephone call. Telephony signaling system 120 receives a first signaling message over an originating line indicating a telephony number and generates a second signaling message indicating the telephony number and the OLI for the telephony call. Telephony signaling system 120 transfers the second signaling message for delivery to call processing system 130.

Call processing system 130 receives the second signaling message, and in response, processes the telephony number to identify a RespOrg for the telephony call. Call processing system 130 processes the OLI from the second signaling message based on the identified RespOrg to select a CIC and generates a third signaling message indicating the selected CIC for the telephony call. Call processing system 130 transfers the third signaling message for delivery to telephony signaling system 120. Telephony signaling system 120 receives the third signaling message, and in response, generates and transfers a fourth signaling message for delivery to telephony network 140 based on the selected CIC.

Figure 4:
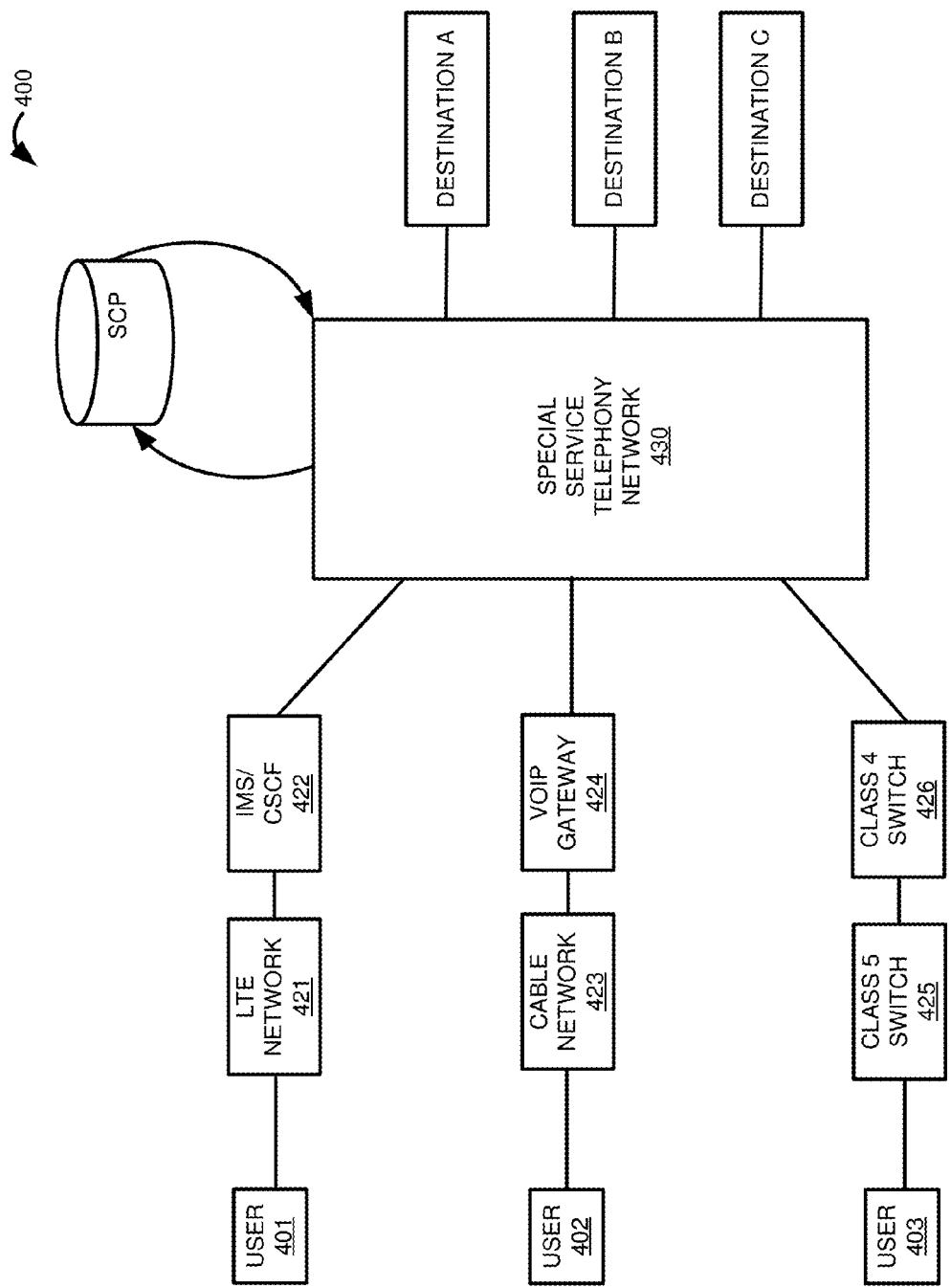
FIG. 4 illustrates a communication system to route telephony signals based on OLI.

FIG. 4 illustrates communication system 400 to route telephony signals based on OLI. Communication system 400 includes users 401-403, LTE network 421, IMS/Call Session Control Function (CSCF) 422, cable network 423, Voice over IP (VoIP) Gateway 424, Class 5 switch 425, class 4 switch 426, special service telephony network 430, and destinations A-C. Although, special service telephony network 430 is shown external to the other elements, special service telephony network could be integrated within the other elements of communication system 400.

For example, user 401 makes a call to a special service telephone number over LTE network 421, which adds OLI information (e.g. "LTE type x") and transfers the call to special service telephony network 430. Special service telephony network 430 queries SCP for the routing information (e.g. RespOrg, destination number, etc). Special service telephony network receives the routing information, and processes the OLI from the second signaling message based on the identified RespOrg to select a CIC and generates a third signaling message indicating the selected CIC for the telephony call. Special service telephony network 430 transfers the third signaling message for delivery to LTE network 421/ IMS CSCF 422. LTE network 421/IMS CSCF 422 receives the third signaling message, and in response, generates and transfers a fourth signaling message for delivery to the destination based on the selected CIC.

Figure 5:
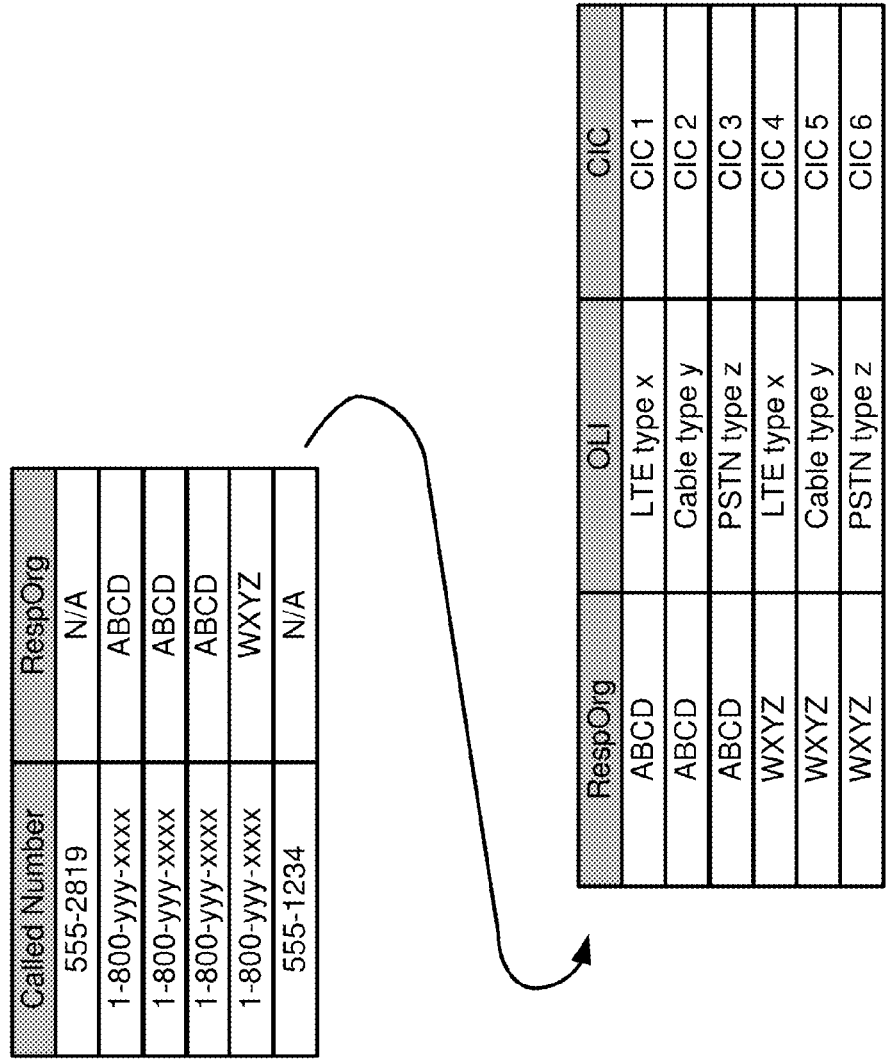
FIG. 5 illustrates the translation of CIC based on OLI and RespOrg.

FIG. 5 illustrates the translation of CIC based on OLI and RespOrg. The communication switching system receives the special service call indicating a special service number, here 1-800-yyy-xxxx. The special service number is then processed to determine a corresponding RespOrg code of ABCD. Once determined, the OLI is processed based on the identified RespOrg to select a CIC. For example, if the call was originated over a cable network, CIC 2 is selected. In another example, the special service call is originated over an LTE network, and CIC 1 is selected.

Figure 6:
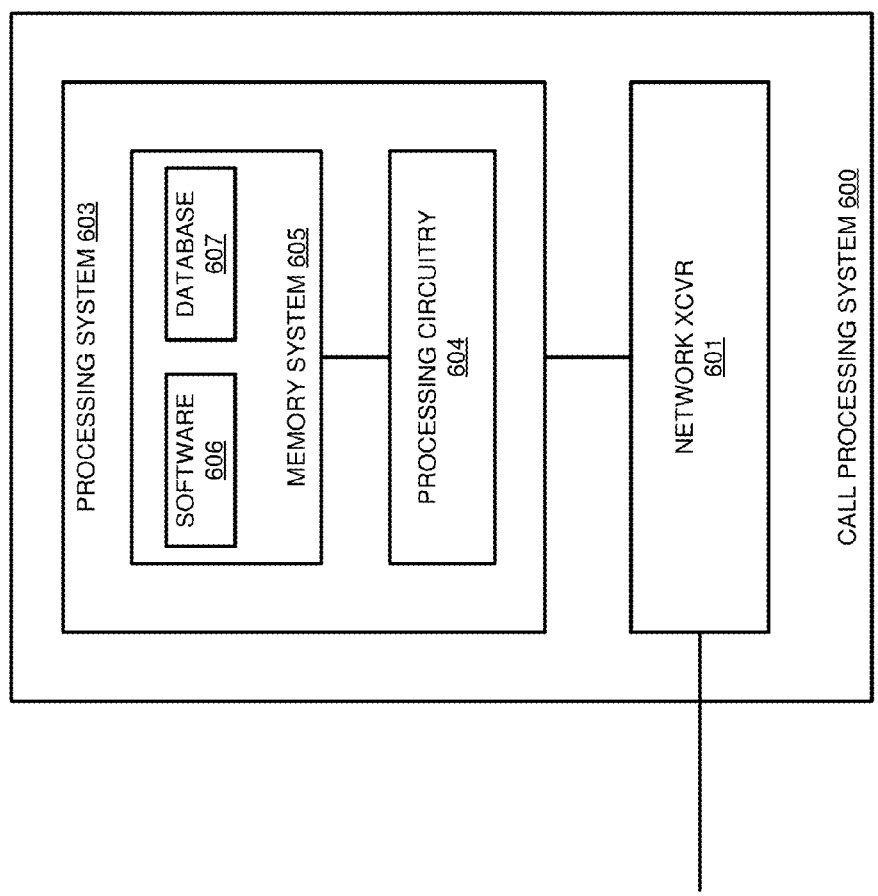
FIG. 6 illustrates an example of a call processing system to route telephony signals based on OLI.

FIG. 6 illustrates call processing system 600 to route telephony signals based on OLI. Call processing system 600 is an example of call processing systems 130 and 430, although systems 130 and 430 may use alternative configurations. Call processing system 600 could be a discrete system, a distributed system, and/or could be integrated into other systems, such as in the softswitches.

Call processing system 600 comprises network transceiver 601 and processing system 603. Processing system 603 comprises processing circuitry 604 and memory system 605 that stores operating software 606 and database 607. Processing system 603 is linked to transceiver 601. Call processing system 600 may include other well-known components that are not shown for clarity, such as routers, servers, computer systems, databases, and power systems.

Network transceiver 601 comprises a physical communication port, signal processing circuitry, software, and/or some other communication components. Network transceiver 601 may use various protocols, such as IP, TDM, Ethernet, wireless, or some other network communication format—including combinations thereof. Network transceivers 601 exchanges signaling and other control data with communication nodes as described herein.

Processing circuitry 604 comprises microprocessor and other circuitry that retrieves and executes operating software 606 from memory system 605. Memory system 605 comprises a computer-readable storage medium, such as a disk drive, flash drive, data storage circuitry, or some other memory apparatus. Memory system 605 could be a single device or be distributed across multiple devices. Processing circuitry 604 is typically mounted on one or more circuit boards that may also hold memory system 605 and portions of network transceiver 601.

Database 607 comprises data structures that associate special service numbers with their corresponding network identifiers of the responsible/controlling networks. The data structures may include special service number translations to yield routable telephone numbers.

Operating software 606 comprises computer programs, firmware, or some other form of computer-readable processing instructions. Operating software 606 may include an operating system, utilities, drivers, network interfaces, applications, or some other type of software. When executed by processing circuitry 604, operating software 606 directs processing system 603 to operate call processing system 600 as described herein. In particular, call processing system 600 routes telephony signals based on OLI.

Referring back to FIG. 1, user 101 comprises communication devices, such as telephone, computer, e-book, mobile Internet appliance, wireless network interface card, media player, game console, or some other communication apparatus—including combinations thereof. Communication devices comprise Radio Frequency (RF) communication circuitry and an antenna. The RF communication circuitry typically includes an amplifier, filter, modulator, and signal processing circuitry. Communication devices may also include a user interface, memory device, software, processing circuitry, or some other communication components.

Telephony signaling system 120 may comprise RF communication circuitry and an antenna. The RF communication circuitry typically includes an amplifier, filter, RF modulator, and signal processing circuitry. Telephony signaling system 120 may also comprise a router, server, switches, gateways, memory device, software, processing circuitry, cabling, power supply, network communication interface, structural support, or some other communication apparatus.

Call processing system 130 comprises a computer system and communication interface. Call processing system 130 may also include other components such as a router, server, data storage system, and power supply. Call processing system 130 may reside in a single device or may be distributed across multiple devices. Call processing system 130 is shown externally to telephony signaling system 120, but call processing system 130 could be integrated within the components of telephony signaling system 120.

Telephony network 140 comprises network elements that provide communications services to user 101 through telephony signaling system 120. Telephony network 140 may comprise switches, wireless access nodes, Internet routers, network gateways, application servers, computer systems, communication links, or some other type of communication equipment—including combinations thereof.

Communication links 111-113 uses metal, glass, air, space, or some other material as the transport media. Communication links 112-113 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication links 111-113 could be a direct link or may include intermediate networks, systems, or devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system to route telephony signaling, the method comprising:
in a telephony signaling system, receiving a first signaling message over an originating line indicating a telephony number for a telephony call, wherein the first signaling message comprises a Session Initiation Protocol (SIP) signaling message, and in response, generating a second signaling message indicating the telephony number and Originating Line Information (OLI) for the telephony call and transferring the second signaling message for delivery to a call processing system, wherein generating the second signaling message indicating the OLI comprises indicating wireless access for the OLI;
in the call processing system, receiving the second signaling message and processing the telephony number to identify a Responsible Organization (RespOrg) for the telephony call, and in response, processing the OLI from the second signaling message based on the identified RespOrg to select a Carrier Identity Code (CIC) for the telephony call, wherein processing the OLI based on the identified RespOrg to select the CIC comprises processing a wireless access indication based on routing logic associated with the RespOrg to select the CIC for a telephony network wherein the telephony network handles wireless access originated telephony, and generating a third signaling message indicating the selected CIC for the telephony call, and transferring the third signaling message for delivery to the telephony signaling system; and
in the telephony signaling system, receiving the third signaling message for the telephony call, and in response, generating a fourth signaling message for the telephony call and transferring the fourth signaling message for delivery to a telephony network based on the selected CIC, wherein the fourth signaling message comprises a SIP signaling message.

2. The method of claim 1 wherein:
the wireless access for the OLI comprises Wireless Fidelity (Wifi);
the wireless access indication comprises a Wifi indication; and
the wireless access originated telephony comprises Wifi-originated telephony.

3. The method of claim 1 wherein:
the wireless access for the OLI comprises Long Term Evolution (LTE);
the wireless access indication comprises an LTE indication; and the wireless access originated telephony comprises LTE-originated telephony.

4. The method of claim 1 wherein:
the wireless access for the OLI comprises Code Division Multiple Access (CDMA);
the wireless access indication comprises a CDMA indication; and the wireless access originated telephony comprises CDMA-originated telephony.

5. The method of claim 1 wherein:
the wireless access for the OLI comprises Global System for Mobile Communications (GSM);
the wireless access indication comprises a GSM indication; and the wireless access originated telephony comprises GSM-originated telephony.

6. The method of claim 1 wherein:
generating the second signaling message indicating the OLI further comprises indicating a radio frequency band for the OLI; and
processing the OLI based on the identified RespOrg to select the CIC further comprises processing the radio frequency band indication based on routing logic associated with the RespOrg to select the CIC for the telephony network wherein the telephony network handles telephony over the radio frequency band.

7. The method of claim 1 wherein:
generating the second signaling message indicating the OLI further comprises indicating satellite communications for the OLI; and
processing the OLI based on the identified RespOrg to select the CIC further comprises processing the satellite communications indication based on routing logic associated with the RespOrg to select the CIC for the telephony network wherein the telephony network handles satellite communications originated telephony.

8. The method of claim 1 wherein the telephony number comprises a special service number.

9. A communication system to route telephony signaling, the communication system comprising:
a telephony signaling system and a call processing system comprising:
at least one processor; and
one or more non-transitory computer readable media coupled to the at least one processor storing instructions that when executed by the at least one processor cause:
the telephony signaling system to receive a first signaling message over an originating line indicating a telephony number for a telephony call, wherein the first signaling message comprises a Session Initiation Protocol (SIP) signaling message, and in response, generate a second signaling message indicating the telephony number, Originating Line Information (OLI) for the telephony call, and wireless access for the OLI; and transfer the second signaling message for delivery to the call processing system;
the call processing system to receive the second signaling message and process the telephony number to identify a Responsible Organization (RespOrg) for the telephony call, and in response, process a wireless access indication based on routing logic associated with the RespOrg to select a Carrier Identity Code (CIC) for a telephony network, wherein the telephony network handles wireless access originated telephony, generate a third signaling message indicating the selected CIC for the telephony call, and transfer the third signaling message for delivery to the telephony signaling system; and
the telephony signaling system to receive the third signaling message for the telephony call, and in response, generate a fourth signaling message for the telephony call and transfer the fourth signaling message for delivery to a telephony network based on the selected CIC, wherein the fourth signaling message comprises a SIP signaling message.

10. The communication system of claim 9 wherein:
the wireless access for the OLI comprises Wireless Fidelity (Wifi); and
the wireless access indication comprises a Wifi indication; and the wireless access originated telephony comprises Wifi-originated telephony.

11. The communication system of claim 9 wherein:
the wireless access for the OLI comprises Long Term Evolution (LTE);
the wireless access indication comprises an LTE indication; and the wireless access originated telephony comprises LTE-originated telephony.

12. The communication system of claim 9 wherein:
the wireless access for the OLI comprises Code Division Multiple Access (CDMA);
the wireless access indication comprises a CDMA indication; and the wireless access originated telephony comprises CDMA-originated telephony.

13. The communication system of claim 9 wherein:
the wireless access for the OLI comprises Global System for Mobile Communications (GSM);
the wireless access indication comprises a GSM indication; and the wireless access originated telephony comprises GSM-originated telephony.

14. The communication system of claim 9 wherein:
the telephony signaling system is configured to generate the second signaling message further indicating a radio frequency band for the OLI; and
the call processing system is configured process the radio frequency band indication based on routing logic associated with the RespOrg to select the CIC for the telephony network wherein the telephony network handles telephony over the radio frequency band.

15. The communication system of claim 9 wherein:
the telephony signaling system is configured to generate the second signaling message further indicating satellite communications for the OLI; and
the call processing system is configured process the satellite communications indication based on routing logic associated with the RespOrg to select the CIC for the telephony network wherein the telephony network handles satellite communications originated telephony.

16. The communication system of claim 9 wherein the telephony number comprises a special service number.

* * * * *